(12) United States Patent
Kerestan et al.

(10) Patent No.: US 9,279,740 B2
(45) Date of Patent: Mar. 8, 2016

(54) APPARATUS FOR LOCATION OF VEHICLE CENTER FOR AERODYNAMIC TESTING

(71) Applicants: Aaron R. Kerestan, Delaware, OH (US); Douglas Robert Reed, Heath, OH (US)

(72) Inventors: Aaron R. Kerestan, Delaware, OH (US); Douglas Robert Reed, Heath, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 306 days.

(21) Appl. No.: 13/945,172

(22) Filed: Jul. 18, 2013

(65) Prior Publication Data

US 2015/0020586 A1      Jan. 22, 2015

(51) Int. Cl.
| | |
|---|---|
| G01B 5/14 | (2006.01) |
| G01M 9/02 | (2006.01) |
| G01M 9/04 | (2006.01) |
| G01M 9/06 | (2006.01) |
| G01M 17/007 | (2006.01) |

(52) U.S. Cl.
CPC . *G01M 9/02* (2013.01); *G01B 5/14* (2013.01); *G01M 9/04* (2013.01); *G01M 9/062* (2013.01); *G01M 17/007* (2013.01)

(58) Field of Classification Search
CPC ........... G01B 11/275; G01B 2210/283; G01B 2210/30; G01B 5/14
USPC .............................. 33/520, 608, DIG. 21, 288
See application file for complete search history.

(56) References Cited

U.S. PATENT DOCUMENTS

| | | | | |
|---|---|---|---|---|
| 1,560,539 | A * | 11/1925 | Cooper | 33/503 |
| 2,000,866 | A * | 5/1935 | Smith | 33/288 |
| 2,070,518 | A * | 2/1937 | Smith | 33/572 |
| 4,006,532 | A * | 2/1977 | Hallman | 33/288 |
| 4,621,435 | A * | 11/1986 | Higginbotham | 33/520 |
| 4,922,623 | A * | 5/1990 | Aldrich et al. | 33/608 |
| 4,942,667 | A | 7/1990 | Fournier | |
| 5,207,002 | A | 5/1993 | Humblet | |
| 5,644,854 | A * | 7/1997 | Bergeron | 33/608 |
| 5,647,139 | A * | 7/1997 | Richardson | 33/608 |
| 5,801,834 | A * | 9/1998 | Danielson et al. | 356/620 |
| 6,115,927 | A * | 9/2000 | Hendrix | 33/288 |
| 6,347,457 | B1 * | 2/2002 | Espinoza | G01B 5/0025 33/286 |
| 6,588,287 | B2 | 7/2003 | Gleason et al. | |
| 6,598,308 | B1 * | 7/2003 | Johansson | G01B 5/0025 33/608 |
| 6,769,192 | B2 * | 8/2004 | Johansson et al. | 33/608 |
| 6,997,049 | B2 | 2/2006 | Lacey, Jr. | |
| 7,107,831 | B2 | 9/2006 | Markstaller et al. | |
| 2004/0089065 | A1 * | 5/2004 | Lacey, Jr. | 73/147 |
| 2015/0020586 | A1 * | 1/2015 | Kerestan et al. | 33/520 |

* cited by examiner

*Primary Examiner* — Yaritza Guadalupe-McCall
(74) *Attorney, Agent, or Firm* — Kenealy Vaidya LLP

(57) ABSTRACT

In accordance with one aspect of the present disclosure, an apparatus and a method of testing one of aerodynamic and acoustic characteristics of a vehicle is described. The method includes measuring a vehicle center using a gauge. The gauge includes a carrier section from which a pair of arms extend in opposed directions. Each of the arms has an axle center locator. The carrier section has a vehicle center marker. Upon determination of the vehicle center, the vehicle can be located in a wind tunnel at a predetermined location and exposed to an enhanced air flow.

18 Claims, 6 Drawing Sheets

US 9,279,740 B2

APPARATUS FOR LOCATION OF VEHICLE CENTER FOR AERODYNAMIC TESTING

BACKGROUND

The present exemplary embodiment relates to an apparatus associated with aerodynamic and acoustic testing. It finds particular application in conjunction with aerodynamic and acoustic testing of automotive vehicles, and will be described with particular reference thereto. However, it is to be appreciated that the present exemplary embodiment is also amenable to other like applications.

A wind tunnel is often used to test the aerodynamics and the acoustics of an automotive vehicle. A wind tunnel can include a test section housing within which a vehicle to be tested is positioned. An air flow generator such as a fan or blower is used to create an air stream that is directed through a contraction cone and the test section within which the vehicle is positioned. Wind tunnels may be of an open circuit design in which atmospheric air is drawn into the contraction cone and discharged from the diffuser back to the atmosphere. Alternatively, wind tunnels may be designed to recirculate air in a loop or return flow configuration. A wind tunnel also includes instrumentation for measuring the desired information, such as the wind drag created by a vehicle or sounds created as the wind flows over the vehicle.

Wind tunnels are used extensively in the automotive industry for the purpose of determining the effect of air flow on the major system components of a particular vehicle design. For example, testing may involve evaluating the effect of air flow on the vehicles ability to cool the vehicle engine. In this instance, a "climatic" wind tunnel will be used to verify system performance through a range of simulated environmental conditions.

A second category of vehicle evaluations in a wind tunnel involves evaluating or testing the aerodynamic and acoustic effect of the air flow as it flows around the vehicle. For example, the design of windshield wipers, the design of radio antennas, the overall exterior configuration of the vehicle, the effect of open vs. closed windows, etc. are important and regularly evaluated features of the vehicle's design.

Wind tunnels for use in the aerodynamic and acoustic testing of vehicles require careful design to ensure accurate and reproducible simulation of road conditions at the applicable speeds and thus provide reliable design data. To achieve accurate and reliable results and to avoid resonance problems for aerodynamic and acoustic testing, the ability to precisely position a vehicle at a specific location within the test section of the wind tunnel is important. Moreover, by way of example, if a feature on the surface of a vehicle is being modified to evaluate a change in aerodynamic performance, it is important that the vehicle be positioned at the same location within the testing section for each comparative evaluation.

Presently, a vehicle center is positioned at a designated location within the testing section. A vehicle center is identified on the vehicle manually by using measurement squares and a tape measure. The axle centers are projected down to the floor and the distance between the marks is measured. The measurement is divided in half and the calculated sum is indexed from the front axle center and manually marked onto the vehicle to be tested. This methodology has proven to be time consuming and a source of human error.

SUMMARY

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

In accordance with one aspect of the present disclosure, a method of testing one of aerodynamic and acoustic characteristics of an automotive vehicle is described. The method includes measuring a vehicle center using a gauge. The gauge includes a carrier section from which a pair of arms extends in opposed directions. Each of the arms has an axle center locator. The carrier section has a vehicle center marker. Upon determination of the vehicle center, it can be located in a wind tunnel at a predetermined location and exposed to an enhanced air flow.

According to a second embodiment, a gauge for marking at least one of the center of a length and a width of an automotive vehicle is provided. The gauge has a carrier section and at least two extendible and retractable arms. Each of the arms extends simultaneously an equivalent distance from the carrier section. Each of the arms also includes an axle center locator. The carrier section further includes a vehicle center marker disposed equidistant from the axle center locators.

According to a further embodiment, a gauge for determining the center of a length of an automotive vehicle is provided. The gauge has a carrier section and at least two extendible and retractable arms. Each of the arms extends simultaneously an equivalent distance from the carrier section. The carrier section also includes a means for permanently or temporarily marking the vehicle center.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated samples, however, are not exhaustive of the many possible embodiments of the disclosure. Other advantages and novel features of the disclosure will be set forth in the following detailed description of the disclosure when considered in conjunction with the drawings, in which.

DETAILED DESCRIPTION

The present disclosure relates generally to wind tunnel testing and more particularly to an apparatus suited to precisely and repeatedly position an object at a predetermined location within the test section of the wind tunnel. Although a wind tunnel has a variety of applications and can be used in virtually any application to test the reaction of a test object to an air flow, it has particular application to the automotive industry for aerodynamic and acoustic testing of vehicle configurations in air flows ranging from approximately 5 miles per hour to as high as 200 miles per hour or more.

The phrase "aerodynamic and acoustic testing" of a vehicle or other test object, unless otherwise specified, shall mean setting up, collecting and evaluating climatic and/or air flow and/or acoustic data resulting from positioning the test vehicle or other object in a wind tunnel at applicable air flow speeds.

Figure 1:
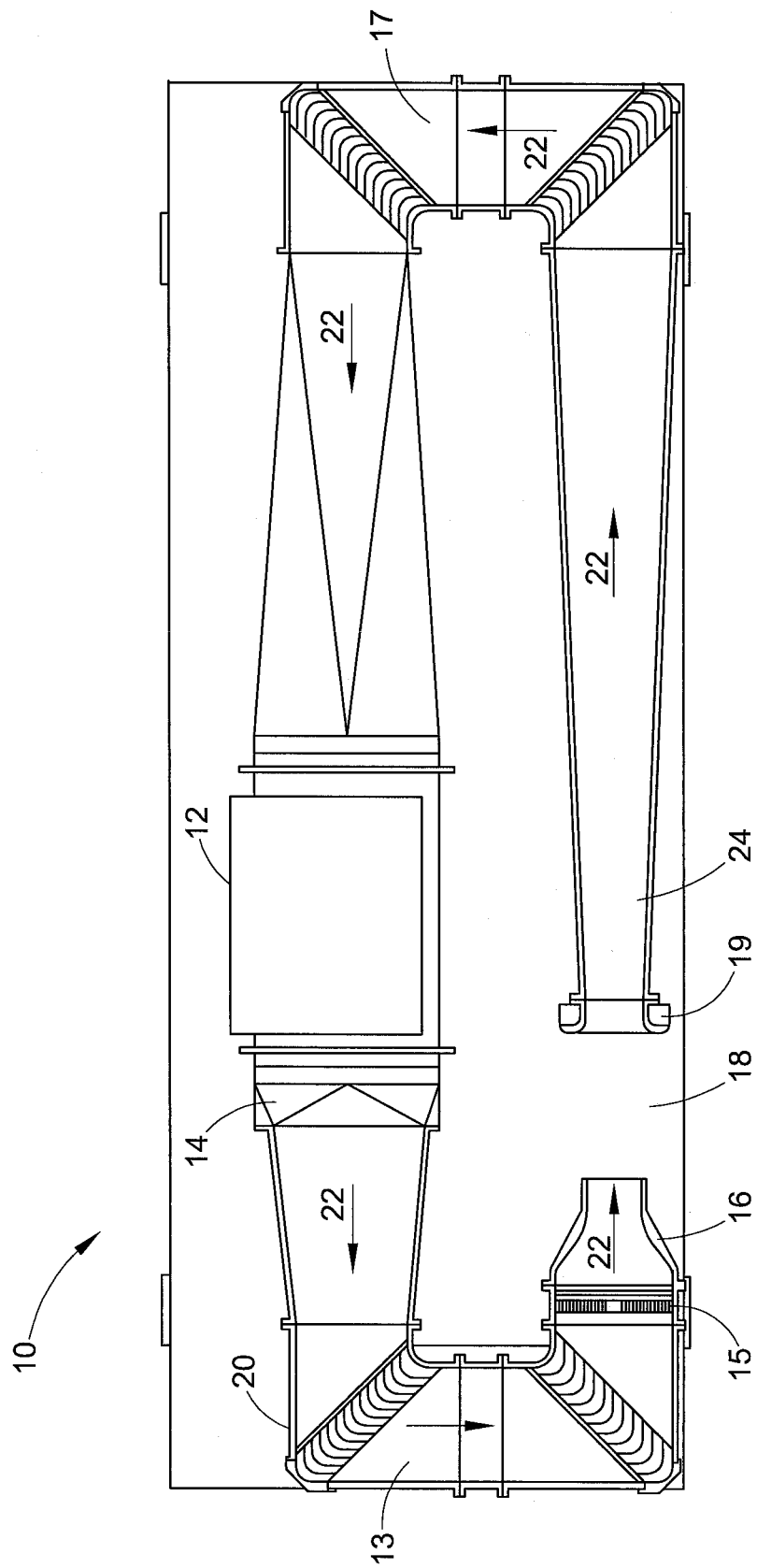
FIG. 1 is a top plan view of a wind tunnel in accordance with the present description.

Reference is first made to FIG. 1 showing a top plan view of a representative wind tunnel 10. The wind tunnel 10 includes a flow generator which is commonly in the form of a fan 12, a heat exchanger assembly 14, a plurality of turning vanes 13 and 17, one or more flow conditioning elements 15, a nozzle 16, a test section 18 and a collector 19. During operation, the fan 12 is driven by a motor to create a high velocity air flow stream (or air flow) 22 in the flow duct 20. An object being tested is positioned in test section 18. The actual air speed which is generated depends on the intended test being performed in the wind tunnel. The depicted embodiment utilizes a fan 12 to accelerate the air because of its ability to move large volumes of air. However, those skilled in the art will realize that various alternate flow generating means can be used as well such as blowers, compressors, diffusers, nozzles, vacuum tanks, high pressure storage chambers and various combinations thereof.

As stated, a motor drive (not shown) powers the fan 12. Because some of the energy supplied by the motor drive and the fan 12 is converted into heat, a heat exchanger 14 can be provided. The temperature of the air leaving the heat exchanger 14 will vary depending upon the intended application of the wind tunnel 10 and the velocity of the air flow 22 involved; however, a typical temperature for air exiting the heat exchanger 14 for automotive applications is in the range of −50 to +60° C. As expressed earlier, climate control allows testing of a vehicle cooling efficiency at various temperatures and wind speeds.

After leaving the heat exchanger 14, the air flow stream 22 travels through the turning vane 13 which changes the flow direction of the flow stream 180 degrees, directing the air flow 22 into the flow conditioning elements 15. The flow conditioning elements 15 straighten the air flow stream 22 to reduce any turbulence.

Upon leaving the flow conditioning elements 15, the air flow stream 22 is further accelerated via the nozzle 16 before exiting the nozzle and entering the test section 18. During use, the air flow stream 22 passes over a test object in the test section 18 before being returned by the collector 19 to the flow duct 24, through the turning vane 17 and back to the flow generator 12.

Figure 2:
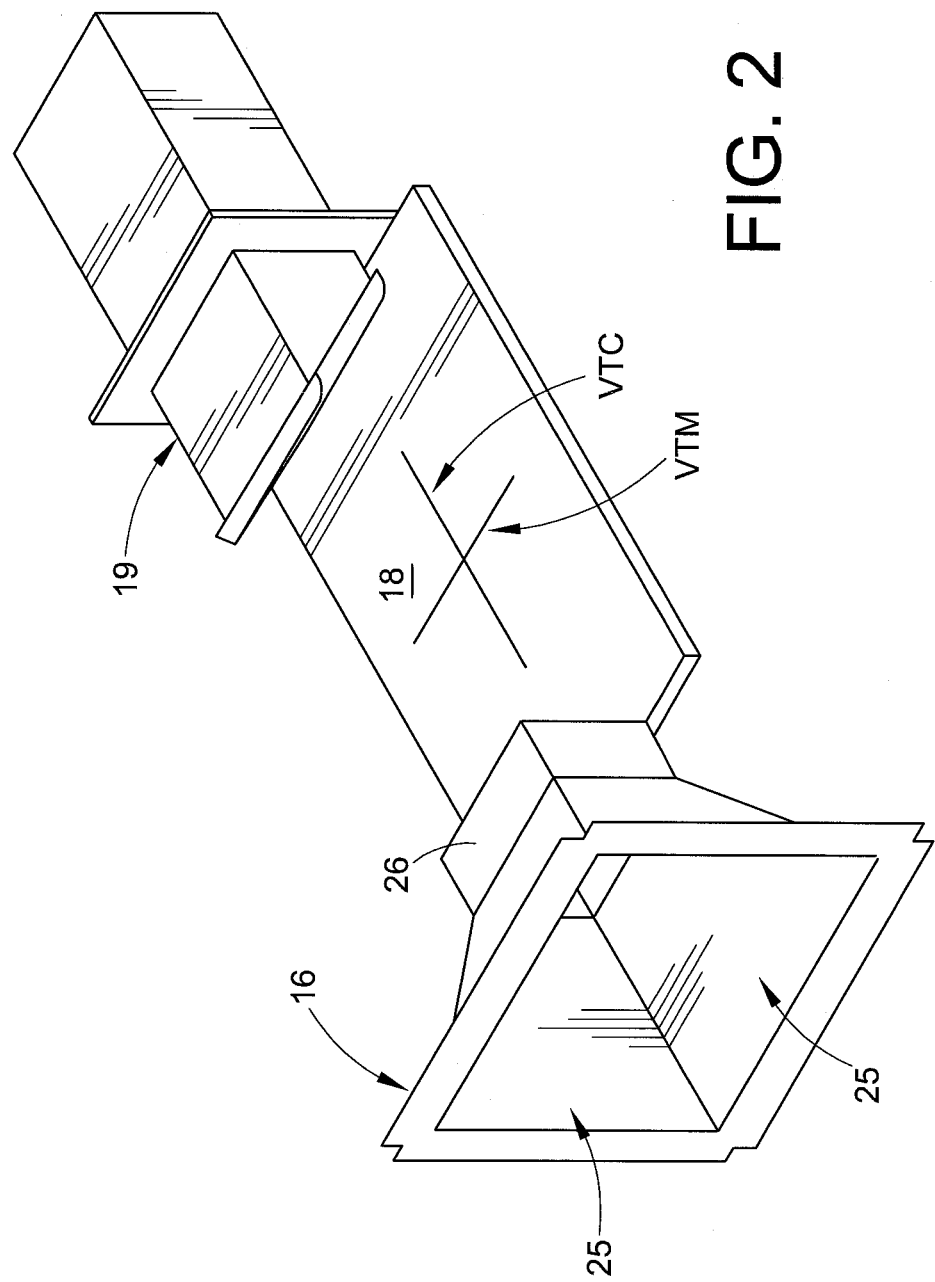
FIG. 2 is an isometric view of the test portion of the wind tunnel of FIG. 1.
Figure 3:
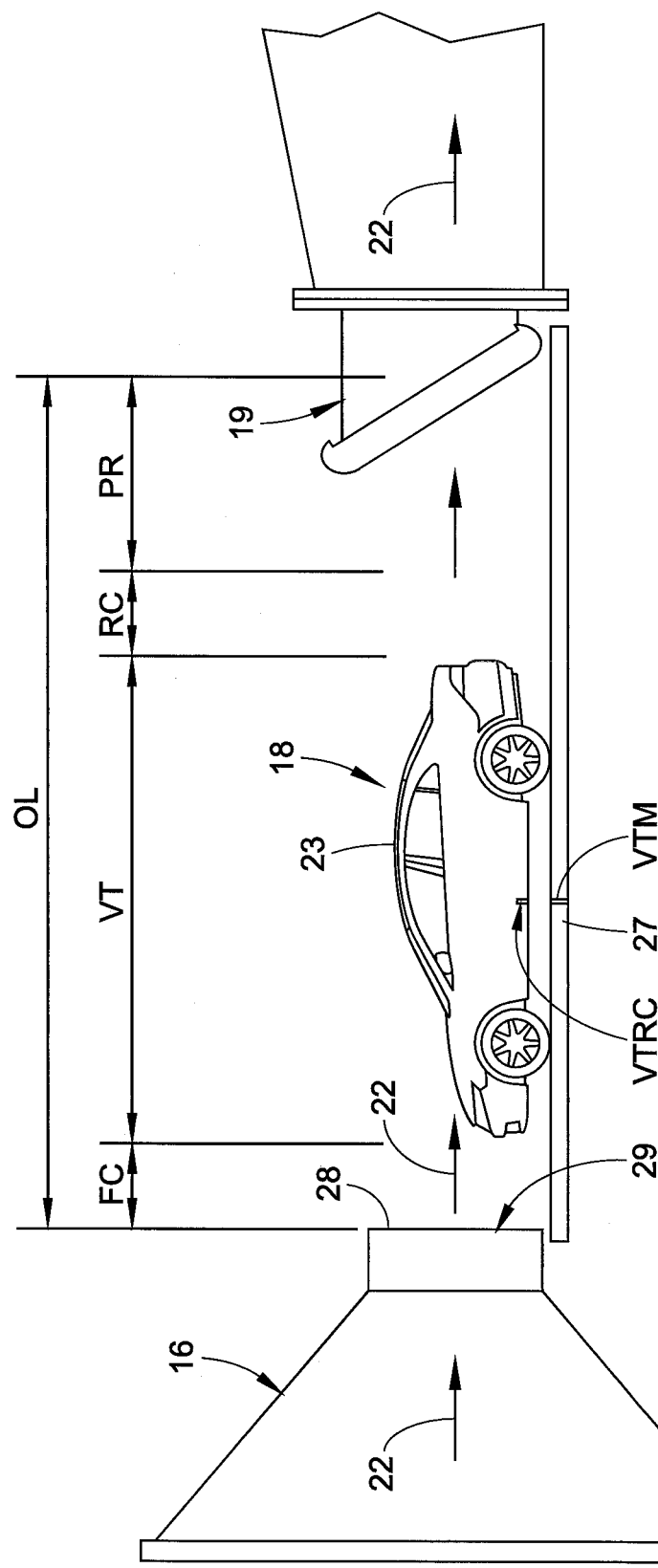
FIG. 3 is a side elevation view of the test section of the FIG. 2.

With specific reference to FIGS. 2 and 3, the test area of the wind tunnel is illustrated in greater detail. Particularly, the nozzle 16, the test section 18 and the collector 19 comprise the test area. The nozzle 16 includes a plurality of sloping walls 25 which converge in the direction of the air flow 22 toward a nozzle exit member 26. The nozzle 16 can include four shaped and converging walls 25 to accelerate the air flow 22 and four side walls defining the nozzle exit member 26. The nozzle exit member 26 includes a side wall which extends generally parallel to the air flow 22 for a short distance and terminates at an air flow exit end 28 (see FIG. 3).

The air flow exit end 28 defines the air flow exit opening 29 (see FIG. 3) through which the air flow 22 passes and encounters the test vehicle 23. The exit end 28 can be in a plane generally perpendicular or orthogonal to the movement of the air flow 22 through the nozzle assembly 16. Thus, the cross sectional configuration of the nozzle assembly 16 cut along a plane generally orthogonal to the air flow 22 is rectangular. Such cross sectional configuration, and thus the number and configuration of the walls 25 and nozzle exit member 26, however, may be modified depending upon the characteristics of air flow desired and the specific application of the wind tunnel 10.

With specific reference to FIG. 3, the overall length OL of the test section 18 extends from the outlet end of the nozzle 16 to the inlet at the base of the collector 19. This test section length OL is comprised of a forward clearance length FC, a vehicle test length VT, a rear clearance length RC and a pressure rise length PR. A test vehicle 23 is located in the test section 18. The vehicle test length VT can represent the maximum vehicle length that can be tested while still obtaining accurate and reliable aerodynamic and acoustic test data.

In general, as air flows from the exit end 28 through the test section 18, a front clearance length FC is required to avoid influence of the vehicle on the nozzle flow and to ensure minimal influence of the nozzle 16 on the measurements on the vehicle 23. In general, it is expected that the front clearance length FC for most wind tunnels will be about three-fourths of the hydraulic diameter of the nozzle 16 opening. After the air flow 22 passes the test vehicle 23, a certain distance is needed in the form of the rear clearance length RC to avoid influence of the pressure rise on the measurements on the vehicle 23. Following this, the pressure begins to increase in the pressure rise length PR area as the air flow 22 approaches the collector 19. In general, the combined length of the rear clearance length RC and pressure rise length PR in most wind tunnels is expected to be about one to three times the hydraulic diameter of the exit end 28.

Within the vehicle test length VT zone it has been determined that accurately and repeatedly positioning the vehicle center at a designated location can be advantageous. Accordingly, to one embodiment, the predetermined location places the vehicle track center VTRC at a defined position within the vehicle test length VT zone. The predetermined location may place the vehicle track center VTRC at a vehicle test length VT zone midpoint VTM. However, the skilled practitioner may prefer an alternative—forward or backward—location for vehicle positioning. In this regard, one aspect of significance of the present disclosure is to provide an apparatus and method to accurately and rapidly identify and mark the vehicle center to allow the vehicle to be positioned on a predetermined location, wherever that may be.

Similarly, in one embodiment, the vehicle width center VWC can be positioned on the vehicle test length VT zone centerline VTC. The location where the centerline VTC and midpoint VTM overlap signifies the center of the vehicle test length VT zone. Similarly, the location where the vehicle width center VWC and vehicle track center VTRC intersect represents the vehicle center. Accordingly, determining the vehicle track center VTRC and the vehicle width center VWC allows a center point of the vehicle 23 to be positioned to overlie the center point of the vehicle test length VT zone.

Of course, the present disclosure contemplates a scenario where neither, one, or both of the midpoint VTM and centerline VTC are used to position the vehicle 23 within the testing section 18. Moreover, the midpoint VTM and centerline VTC are used as examples. In this regard, the design engineer may choose an alternate preferred location to position the vehicle 23 in the test zone 18. Nonetheless, the apparatus and methodology described below well facilitate the accurate and rapid positioning of the vehicle at whatever testing position is selected.

With reference to FIGS. 4-7, an apparatus for locating and marking a vehicle center is described. Moreover, for acoustic and aerodynamic studies it is critical to place vehicles accurately in the testing facility. As identified above, there may be a particular location within the testing facility which is preferential for testing purposes. Furthermore, for comparative testing between vehicles or a vehicle having structural modifications evaluated, it is desirable that the vehicle be repeatedly positioned at the same location within the wind tunnel.

As used herein, the vehicle center is considered one half the distance between the track and the width. More particularly, the vehicle track center VTRC is one half the distance between the front and rear axle and the vehicle width center VWC is one half the distance between the center of the vehicle wheels (e.g. opposed left and right front wheels). The center of the vehicle is the intersection of these two lines.

Figure 4:
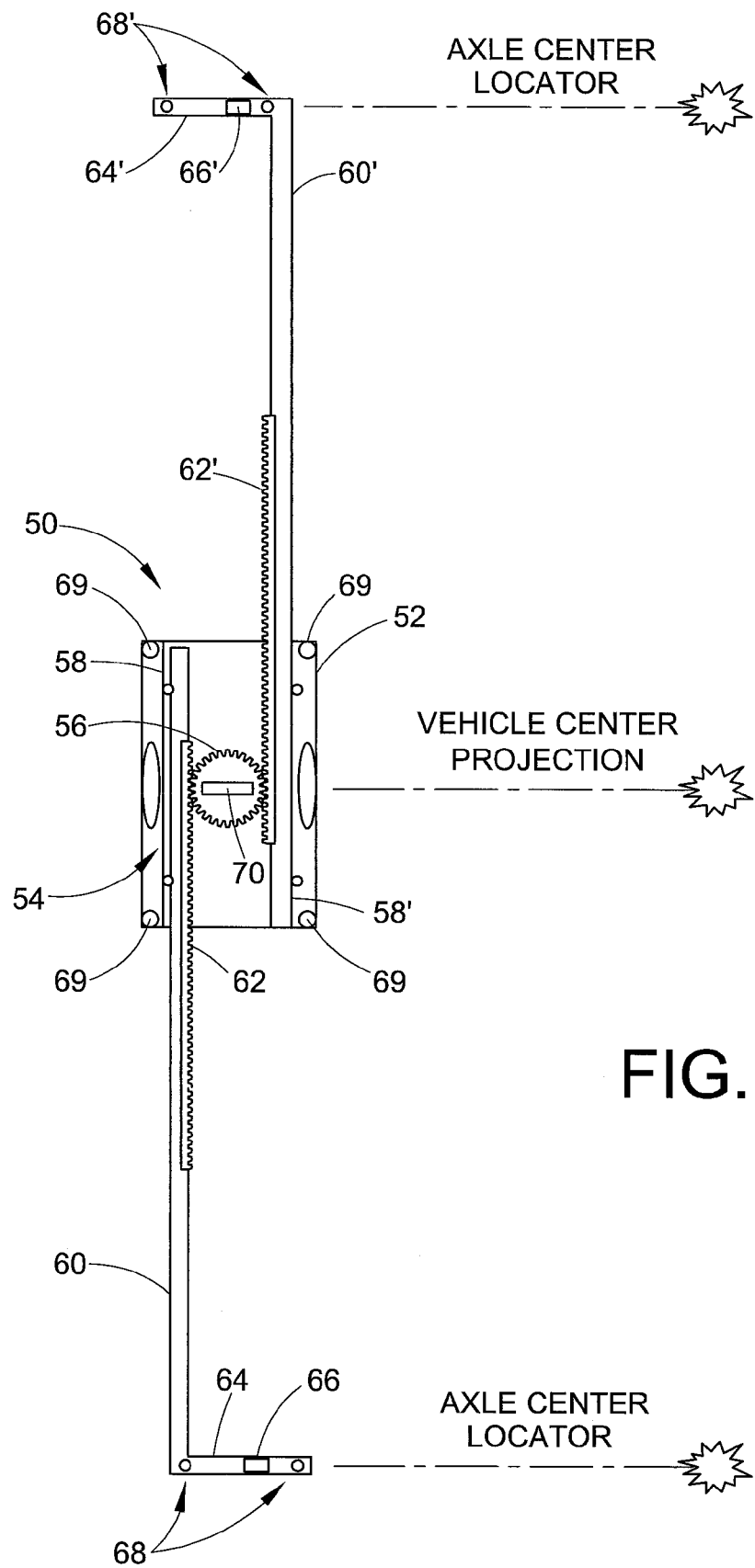
FIG. 4 is a top schematic view (partially in phantom) of the measuring apparatus of the present disclosure.

With specific reference to FIG. 4, an apparatus 50 for rapidly and repeatedly determining the vehicle center is depicted. Apparatus 50 includes a floating carrier section 52 which can comprise a metal frame box 54 housing a single pivoting gear 56. Box 54 can further include tracks 58 and 58' which receive opposed extendible and retractable arms 60 and 60' include a gear rack portion 62 and 62' designed to engage pivoting gear 56.

In accord with the design, arms 60 and 60' operate in concert wherein each is extended or retracted to the same degree as its counterpart. Moreover, single pivoting gear 56 which engages the respective rack portions 62 and 62' of arms 60 and 60' on opposed sides necessarily extends and/or retracts the arms simultaneously and to the same extent.

Arms 60 and 60' can have the same overall length and each can include a terminal leg 64 and 64' generally extending tangentially to the arms 60 and 60'. Each of the legs 64 and 64' can further include projections 65 and 65', potentially formed of a relatively high tack material, such as rubber or plastic, which can engage the surface upon which the vehicle is positioned and facilitate a stable positioning. Each leg 64 and 64' can include an axle center locator, such as a light emitting device 66 and 66'. The light emitting device can be lasers, LEDs or a focused incandescent light. Light emitting devices 66 and 66' are generally axially aligned with legs 64 and 64' to emit a visible marker generally tangential to arms 60 and 60'. It is also envisioned that the light emitting devices can be affixed directly to the arms 60 and 60' and the legs 64 and 64'.

Advantageously, the light emitting devices 66 and 66' can be located at a height off the surface upon which the carrier section 52 rests that is representative of an average vehicle axle height. In addition, it is envisioned that the light emitting devices 66 and 66' may be secured to the legs 64 and 64' or arms 60 and 60' via an adjustable clamping mechanism (not shown), allowing the height and/or the direction of light emission to be adjusted vertically. Moreover, it is desirable that the light emitting devices 66 and 66' provide a light beam that can be reasonably closely associated with the vehicle axle to assure that the legs 64 and 64' are extended to the appropriate degree and that the floating carrier 52 is therefore accurately positioned at the vehicle center. Alternatively, it is viable that the light emitting devices 66 and 66' have a fan shaped emissive pattern allowing an extended vertical line of light emission to fall upon the vehicle 23.

The floating carrier section 52 will be placed upon wheels, rollers or casters 69 that allow proper positioning of the apparatus 50. A vehicle center projection device 70 (such as a light emitting device) will be secured to the floating carrier section 52 at a location which bisects the distance between the ends of opposed legs 64 and 64'. This can overlie the center of pivoting gear 56. In this manner, the projection device 70 with its direction of light emission being perpendicular to the longitudinal axis of the arms 60 and 60' is located at the center of the device. The light emitted by the device 70 provides a vehicle track center VTRC that can be manually marked on the vehicle 23. Particularly, indicia can be applied via paint, tape, ink, etc. to reflect the vehicle track center VTRC or vehicle width center VWC.

It is also envisioned that the floating carrier section 52 can be used actively to position the vehicle 23 at the designated location within the test section 18. Moreover, it would be feasible to roll the gauge apparatus 50 in concert with the vehicle 23 forward or backward motion until the vehicle 23 is properly centered.

Although described as a light emitting device, a mechanism such as a paint gun or mechanically extending telescoping projection capable of providing an alignment aid and/or marking is also suitable in association with either the legs 64 and 64' or the carrier 52 as opposed to the light emitting device 66 and 66'.

Figure 5:
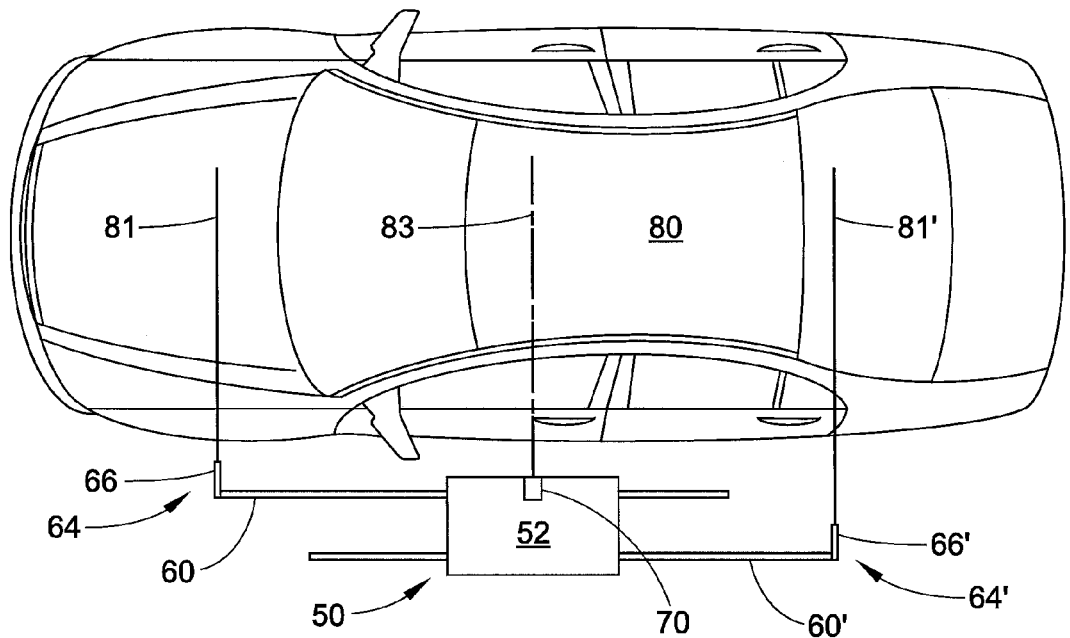
FIG. 5 is a top plan view of the measuring apparatus of FIG. 5 used in association with an automotive vehicle to determine vehicle track center.
Figure 6:
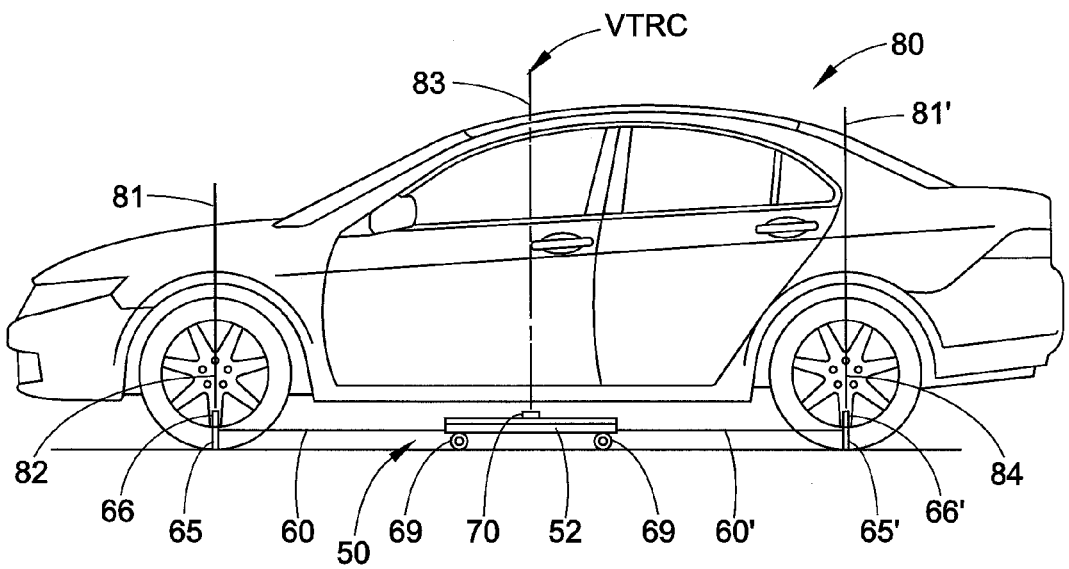
FIG. 6 is a side elevation view of FIG. 5.

With reference to FIGS. 5 and 6, a vehicle 80, such as the test vehicle 23, is depicted having a track distance between a front axle 82 and a rear axle 84. By positioning the apparatus 50 with arms 60 and 60' extended from the carrier 52 a vehicle center can be identified. More particularly, light emitting devices 66 and 66' are aligned with the front and rear axles 82 and 84, respectively, as demonstrated by alignment projections 81 and 81', rendering the vehicle track center projection 83 as generated by light emitting device 70 properly positioned for marking of the vehicle center.

Figure 7:
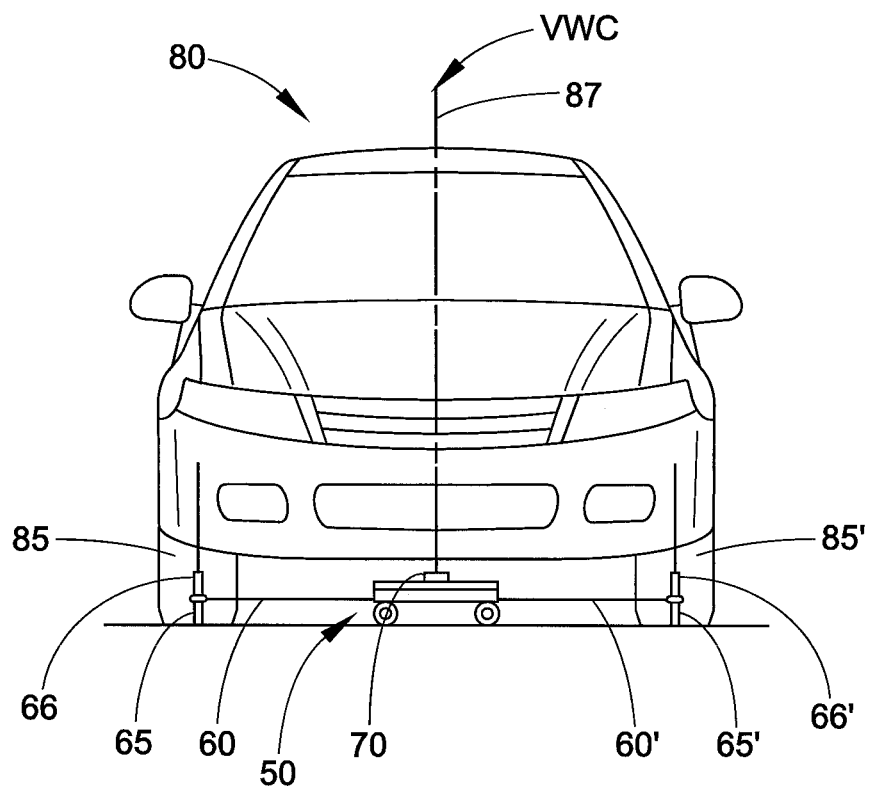
FIG. 7 is a front elevation view of the apparatus of FIG. 5 as associated with an automotive vehicle to determine vehicle width center.

With reference to FIG. 7, the use of the apparatus 50 to determine the center of the vehicle width is depicted. Moreover, arms 60 and 60' are extended to a position where legs 64 and 64' including the light emitting devices 66 and 66' are aligned with a center of each of the left and right side wheels 85 and 85', respectively. By its design, this places light emitting device 70 with its projection 87 at the center of the width of the vehicle facilitating the marking thereof. As indicated previously, this marking can be done by the apparatus itself such as with a paint gun, or can be performed manually with a marker or tape.

By utilizing the presently disclosed apparatus in the manner described, the vehicle can be properly marked with a track center and a width center. The vehicle center will be the intersection of the track center and the width center. Of course either of those dimensions can be used independently to position the vehicle at a desired location within the wind tunnel testing facility.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for marking at least one of a center of a length and a width of a vehicle, said method comprising:
   providing a gauge comprising a carrier section and at least two extendible and retractable arms, each of said arms including an axle center locator and each of said arms extending an equivalent distance from said carrier section;
   positioning said carrier section into a position adjacent said vehicle;
   measuring a vehicle center using the gauge;

marking the vehicle center using a marking device associated with said carrier section;

providing a wind tunnel;

statically supporting the vehicle in said wind tunnel wherein the marked vehicle center is located at a predetermined location; and exposing said vehicle to an enhanced air flow.

2. The method of claim 1 further including:

marking a vehicle width center based on a distance between wheels of a common axle using the marking device.

3. The method of claim 1 wherein said marking device comprises one of a light emitting device, a paint gun, and a telescoping projection.

4. The method of claim 1 wherein said axle center locators comprise a light emitting device.

5. The method of claim 1 further including:

rolling said carrier section into the position adjacent said vehicle.

6. The method of claim 1 further including:

simultaneously extending said arms from said carrier section until said axle center locators are aligned with respective front and rear axles of the vehicle.

7. The method of claim 1 wherein said marking device is a light emitting device and the vehicle center marked by the light emitting device is reflected by the application of a permanent indicia.

8. The method of claim 1 wherein said predetermined location comprises one of a position along a length of said wind tunnel and a longitudinal axis of said wind tunnel.

9. The method of claim 1 further including performing the steps sequentially on a vehicle body having a configuration modification.

10. A gauge for marking at least one of a center of a length and a width of a vehicle, the gauge comprising a carrier section and at least two extendible and retractable arms, each of said arms including an axle center locator, each of said arms extending simultaneously an equivalent distance from said carrier section, the carrier section further comprising a vehicle center marker comprised of a light emitting device disposed equidistant from said axle center locators, wherein said light emitting device is configured to emit light vertically upward.

11. The gauge of claim 10 wherein said carrier section includes a rolling apparatus.

12. The gauge of claim 11 wherein said rolling apparatus is selected from rollers, casters and wheels.

13. The gauge of claim 10 wherein each of said arms includes a gear rack adapted to engage a single pivoting gear associated with said carrier section.

14. The gauge of claim 10 wherein said axle center locator comprises legs extending tangentially to said arm.

15. The gauge of claim 14 wherein said legs further include feet comprised of plastic or rubber.

16. The gauge of claim 10 wherein each arm is the same length.

17. A gauge for marking at least one of a center of a length and a width of a vehicle, the gauge comprising a carrier section and at least two extendible and retractable arms, each of said arms including an axle center locator, each of said arms extending simultaneously an equivalent distance from said carrier section, the carrier section further comprising a vehicle center marker comprised of a light emitting device disposed equidistant from said axle center locators, wherein said axle center locator comprises legs extending tangentially to said arm; and said legs further include a light emitting device configured to emit light horizontally perpendicular to a longitudinal axis of each arm.

18. A wind tunnel comprising a test section bounded at a first end by an airflow generator and a second end by a collector, said test section including an associated gauge for determining the center of at least one of a length and a width of a vehicle, the gauge comprising a carrier section and at least two extendible and retractable arms, each of said arms extending simultaneously an equivalent distance from said carrier section, the carrier section further including a means for marking the vehicle center.

* * * * *